April 26, 1932.　　J. HALTENBERGER　　1,855,290

SLEEVE VALVE ENGINE

Original Filed Aug. 19, 1926　　4 Sheets-Sheet 1

INVENTOR.
JULES HALTENBERGER.
BY
ATTORNEY.

April 26, 1932.  J. HALTENBERGER  1,855,290
SLEEVE VALVE ENGINE
Original Filed Aug. 19, 1926  4 Sheets-Sheet 3

INVENTOR.
JULES HALTENBERGER
BY
ATTORNEY.

April 26, 1932.   J. HALTENBERGER   1,855,290
SLEEVE VALVE ENGINE
Original Filed Aug. 19, 1926   4 Sheets-Sheet 4

INVENTOR.
JULES HALTENBERGER.
BY
ATTORNEY

Patented Apr. 26, 1932

1,855,290

UNITED STATES PATENT OFFICE

JULES HALTENBERGER, OF INDIANAPOLIS, INDIANA, ASSIGNOR, BY MESNE ASSIGNMENTS, TO CONTINENTAL MOTORS CORPORATION, OF DETROIT, MICHIGAN, A CORPORATION OF VIRGINIA

SLEEVE VALVE ENGINE

Application filed August 19, 1926, Serial No. 130,199. Renewed September 9, 1931.

My invention relates to internal combustion engines of the sleeve-valve type, and more especially to those in which a port or ports are controlled by two co-axial sleeves, although some features of my invention are not limited to the two-sleeve type of engine.

It is the object of my invention to provide a ready adjustment and control of the valve timing, desirably of both the inlet and the exhaust; and, in a specific form of my invention, to provide this in the two-sleeve type of engine. In one aspect, it is the object of my invention to provide such a timing control by an adjustable ring other than the regularly moving sleeve-valves themselves; and from this aspect my invention is applicable equally to the two-sleeve and to the single-sleeve type of engine. It is a further object to control this valve-timing by the same mechanism which is ordinarily used to control the speed of engine operation; that is, to control the valve-timing and the carbureter by a common controlling device.

My present application relates to a specific development of an invention which is broadly covered in my United States Letters Patent No. 1,630,245, which resulted from an application co-pending with this. In that patent, there are broad claims which dominate the structure of the present application; but the specific claims in that patent are directed to a single-sleeve type of engine, or to the control of the timing by an axial adjustment of a sleeve-valve itself; whereas the specific claims in this present application are directed to a timing control in a double-sleeve type of engine, or to a timing control which is obtained by the adjustment of a timing ring which is separate from any of the sleeve-valves which are used in the normal valving operation. This latter feature, although not claimed specifically, is disclosed in my aforesaid patent.

In carrying out my invention, as viewed from the aspect of the two-sleeve type of engine, I provide a plurality of co-axial sleeve-valves which control the porting of an engine cylinder, or each of a plurality of engine cylinders in the case of a multi-cylinder engine. These sleeve-valves are usually located between the piston and the cylinder wall, and I have so illustrated them here. These sleeve-valves move to control both the inlet and exhaust of the engine, by suitable movements relative both to each other and to the cylinder. I provide means for varying the location in the cycle of both the inlet and the exhaust, by shifting the point at which the exhaust opens and/or the point at which the inlet closes, and in one form also by shifting the point at which the inlet opens. I may do this by shifting the movement of one of the sleeve-valves itself, axially as shown; but I prefer to do it, according to this present application, by providing a special timing ring which co-operates with the sleeve-valve or sleeve-valves and which is bodily adjustable, axially of the sleeve-valve or sleeve-valves as shown, to control the point of exhaust-opening and the point of inlet-closing. This timing ring may be controlled by the same device which controls the carbureter; in which case the mechanism is desirably arranged to control the throttle of the carbureter during the early part of its movement, and when the throttle is fully opened then to control the timing ring to advance the exhaust opening and retard the inlet closing for faster engine operation.

The accompanying drawings illustrate my invention.

The internal combustion engine embodying my invention may have any suitable crank-shaft 10, the cranks 11 of which are connected by suitable connecting rods 12 to pistons 13 which are reciprocable within cylinders 14, in the usual manner. There may be any number of cylinders. These are shown as water-jacketed cylinders, but that is a mere detail.

In the illustrated forms of my invention, the side walls of each cylinder 14 have inlet ports 15 and exhaust ports 16. These ports are controlled by two sleeve-valves 17 and 18, which are co-axial with and slide upon each other, and which are here shown as interposed between the piston 13 and the cylinder 14 so that the piston 13 actually reciprocates within and directly in contact with the inner sleeve-valve 17. The sleeve-valve 17 is provided at or near its upper ends with inlet and exhaust ports 19 and 20; and the outer sleeve-valve 18 is provided at or near its upper ends with inlet and exhaust ports 21 and 22. The ports 15, 19, and 21 co-operate, and the ports 16, 20, and 22 co-operate, to control the inlet and the exhaust respectively of the associated cylinder. These ports are properly located for the effective opening and closing of the inlet and exhaust passages by the movement of the sleeve-valves 17 and 18; which movement may be effected in various ways, of which several ways are shown.

Figure 1:
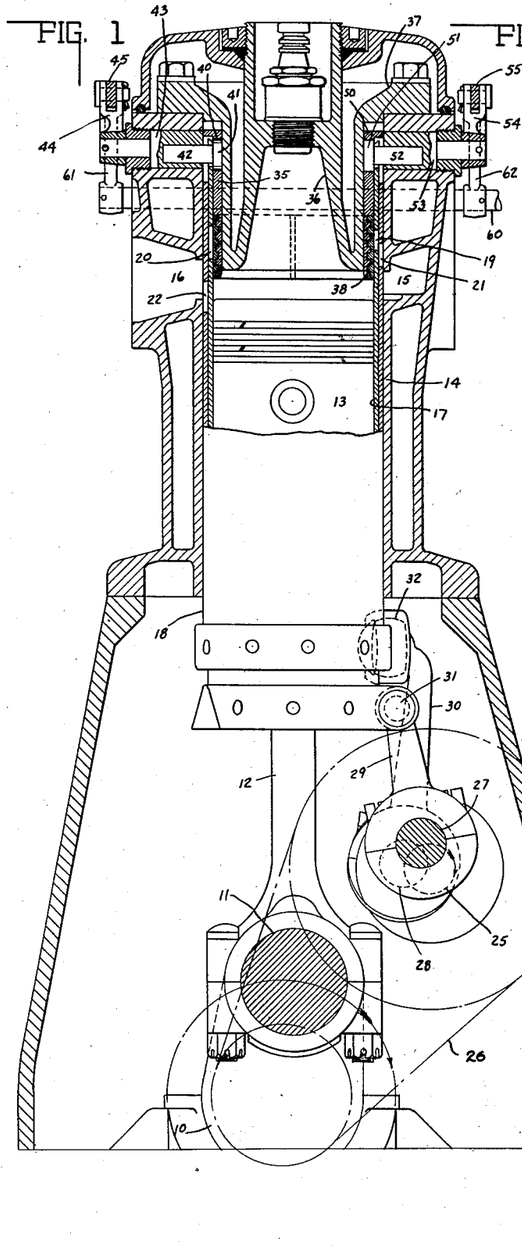
Fig. 1 is a vertical central section through a two-sleeve internal combustion engine embodying one form of my invention, in which form the timing is controlled by a separate timing ring.
Figure 2:
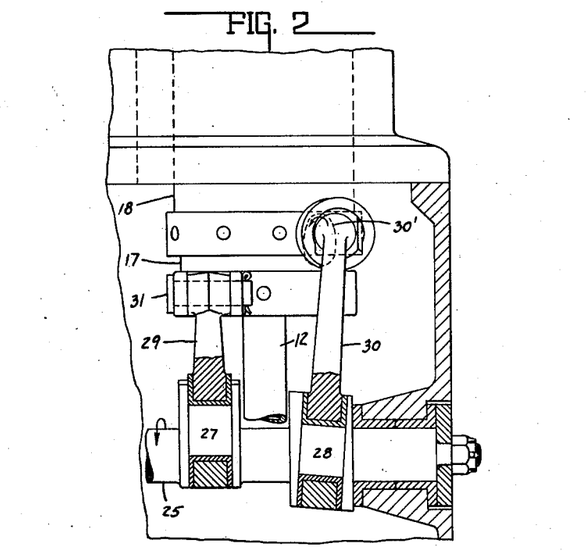
Fig. 2 is a fragmental side elevation of the sleeve-valve operating mechanism of Fig. 1, as viewed from the right of Fig. 1.

In the arrangement shown in Figs. 1 and 2, the movement of the sleeve-valves is obtained from a valve-operating shaft 25; which is driven in any convenient way as by a chain drive 26, so that with the four-stroke-cycle engine shown it moves at half-crank speed. The operating shaft 25 has two cranks 27 and 28 for each cylinder. These two cranks are connected to sleeve-connecting rods 29 and 30 respectively; which are suitably connected to the inner and outer sleeves 17 and 18 respectively. In the arrangement shown in Figs. 1 and 2, the crank 27 is a straight crank, so that the inner sleeve-valve 17 is given a movement of pure reciprocation, and the connecting rod 29 is connected to such inner sleeve-valve 17 by a purely pivotal connection, as by a pivot pin 31; but the crank 28 is a wobble-crank, having its axis non-parallel and desirably non-co-planar with the axis of the valve-operating shaft 25, so that the upper end of the sleeve-connecting rod 30 moves in a closed-curved path 30' of travel, as is indicated in Fig. 2, which produces a motion of combined axial reciprocation and circumferential oscillation of the outer sleeve-valve 18 to produce a corresponding closed-curved path of travel of any point on such outer sleeve-valve. In consequence, the connecting rod 30 is connected to the outer sleeve 19 by a suitable universal joint, shown as a ball-and-socket joint 32. As that type of joint has been described in other applications which I have filed, I shall not attempt to describe it in detail here.

This general type of drive in which at least one of a plurality of sleeves is driven with a combined movement of circumferential oscillation and axial reciprocation is claimed in my co-pending application Serial No. 130,217, filed August 19, 1926. Save for this form of drive for the sleeves to produce this relative movement of combined axial reciprocation and circumferential oscillation, what I have so far described is not essentially different from the general Knight type of engine.

Figures 3, 5:
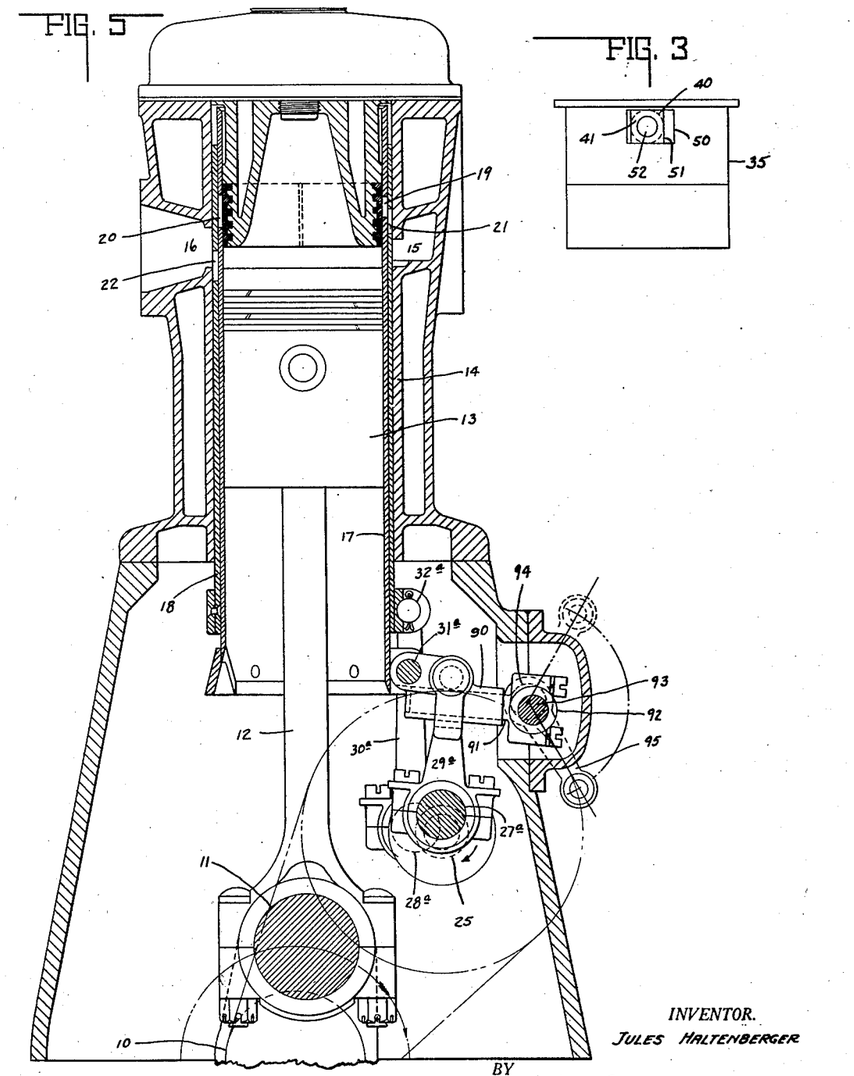
Fig. 3 is a side elevation of the timing ring shown in Fig. 1, as viewed from the right of Fig. 1, showing the operating mechanism for such timing ring.
Fig. 5 is a view generally similar to Fig. 1, but showing the timing control as obtained by varying the location of the movement of one of the sleeve-valves of a two-sleeve engine, and with both sleeves here shown as movable with pure axial reciprocation.

To get the timing control in the structure shown in Figs. 1, 2, and 3, I provide a vertically slidable timing ring 35; which has a sliding fit within the upper end of the inner sleeve-valve 17, and is located between such inner sleeve and a plug portion 36 of a removable cylinder head 37, the plug portion 36 projecting into the head-end of the cylinder and being spaced therefrom to provide an annular space for the timing ring 35 and for the upper ends of the two sleeve-valves 17 and 18. The lower end of the timing-ring 35 may carry a junk-ring 38, which presses resiliently outward against the inner surface of the inner sleeve-valve 17; but this junk-ring is not fundamental to my invention, and may be omitted, as is indicated in the structure shown in Fig. 4. The lower edge of the junk-ring 38, or of the timing ring 35 if there is no junk-ring or the junk-ring extends all the way to the lower edge of the timing ring, co-acts with the ports 19 and 20 of the inner sleeve-valve 17 to control the points where the inlet closes and the exhaust opens in the cycle of engine operation; so that by sliding the timing ring 35 up or down, the location of such points in the cycle may be varied. The timing ring 35 is shown in substantially its lowest position, which it has for slow-speed timing; so that by raising the timing ring 35 from the position shown in Fig. 1, the point of inlet-closing is delayed in the cycle and the point of exhaust opening is advanced in the cycle to produce a longer period of opening for both the exhaust and the inlet and therefore a higher speed of operation by facilitating the inflow and outflow of gases.

With the high-speed adjustment, obtained by raising the timing ring 35, the engine torque is lowered; while by lowering the timing ring for slow-speed operation, the torque is increased.

Figure 8:
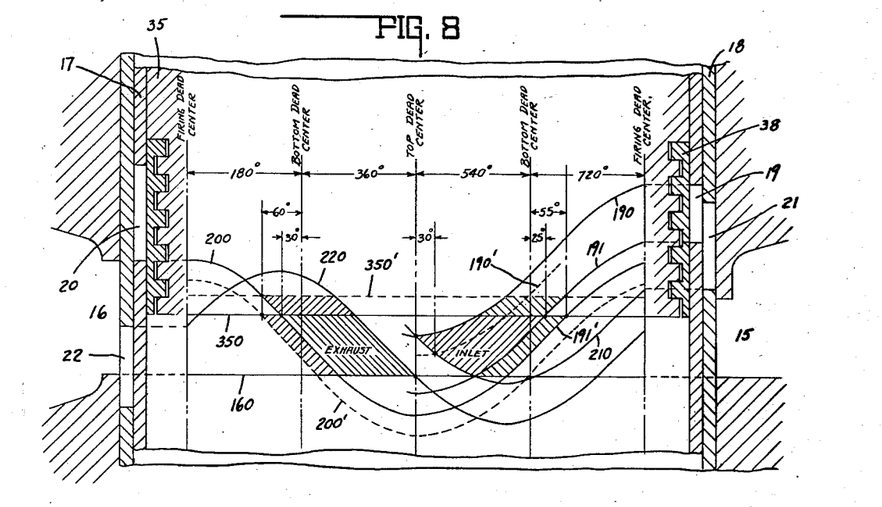
Fig. 8 is a diagram showing the timing control, both for the timing-ring timing-control and for the shiftable-sleeve-valve timing-control.

The effect of raising and lowering the timing ring 35 is apparent from the diagram in Fig. 8; which also shows the ports on a larger scale. Such diagram shows the cycle of operations for a complete engine cycle of 720°, assuming a four-stroke cycle operation. The straight line 350 represents the lower edge of the timing ring 35 or of the junk-ring 38, and indicates the position of such lower edge when the timing ring is lowered; while the dotted line 350' represents such lower edge when the timing ring or junk-ring is raised. The line 160 represents the lower edge of the exhaust port 16 in the cylinder. The line 200 shows the movement through the cycle of the lower edge of the exhaust port 20 of the inner sleeve-valve 17; and the line 220 shows the movement through the cycle of the upper edge of the exhaust port 22 of the outer sleeve-valve 18. Starting from firing dead center, it will be seen from these lines that the lower edge of the port 20 travels downward for about 360°, and then travels upward for the remaining 360°, crossing the line 350 to begin opening the exhaust at about 30° in advance of bottom dead center; but the line 200 crosses the line 350' about 60° in advance of bottom dead center, thus making the opening of the exhaust start about 30° earlier in the engine cycle by raising the timing ring 35 from its lower to its upper position. The closing of the exhaust occurs at about top dead center between the exhaust and inlet strokes, when the upper edge of the port 22 of the outer sleeve 18 passes down beyond the lower edge of the exhaust port 16, as is indicated by where the lines 220 and 160 cross. The exhaust period when the timing ring is lowered is indicated by the space enclosed between the lines 350, 220, 160, and 200, shown by oblique cross-hatching downward from left to right; while the added period of exhaust obtained by raising the timing ring is indicated by the space between the lines 350', 220, 350, and 200, cross-hatched obliquely downward from right to left.

There is a similar increase of the inlet time-area by the movement of the timing ring 35 upward, as is indicated in the right-hand half of Fig. 8. Here there are three additional lines, 190, 191, and 210, to denote the movement of the upper edge of the inlet port 19 of the inner sleeve 17, the movement of the lower edge of the inlet port 19 of the inner sleeve 17, and the movement of the lower edge of the inlet port 21 of the outer sleeve 18. These three lines are not shown complete, but only for a little more than the right-hand half of the engine cycle. The lines 190 and 191 are similar in shape to each other, and to the line 200, but are merely relatively vertically displaced on the diagram; and the line 210 is similar in shape to the line 220, but vertically displaced therefrom on the diagram. The opening of the inlet occurs at or near the top dead center between the exhaust and inlet strokes, by the passing of the upper edge of the port 19 of the inner sleeve 17 upward above the lower edge of the port 21 of the outer sleeve 18, as indicated by the crossing of the lines 190 and 210; and the closing of the inlet is obtained when the lower edge of the port 19 of the inner sleeve 17 passes upward beyond the lower edge of the timing ring 35 or junk-ring 38, as indicated on the diagram by the crossing of the lines 191 and 350. If the timing ring is raised, its lower edge is shifted upward to the position indicated by the line 350'; which, as shown by the diagram, results in delaying the closing of the inlet by about 30°, or from about 25° to 55° past bottom dead center in the cycle of operations.

The vertical movement of the timing ring 35, with its junk-ring 38 if that is provided, may be obtained in any suitable manner. In the arrangement shown in Figs. 1 and 3, I provide such timing ring near the top with a round opening 40 to receive the round head 41 of an eccentrically located pin 42 carried by a rock-shaft 43, which in turn is suitably mounted in the engine cylinder transverse to the cylinder axis and is provided at its outer end with an operating arm 44. The corresponding operating arms 44 of all the cylinders may be connected by a connecting link 45; so that by shifting such link 45 endwise the rock-shafts 43 of all the cylinders are rocked to cause the heads 41 of the eccentrically located pins 42 to move upward or downward to raise or lower all the timing rings 35 correspondingly.

Desirably, in order to prevent possibility of cocking the timing ring, I provide a rectangular opening 50 in it opposite the opening 40, and in this rectangular opening 50 I mount a rectangular block 51 carried by a pin 52 eccentrically mounted in a rock-shaft 53 generally similar to the rock-shaft 43. The rock-shaft 53 is provided at its outer end with an operating arm 54; and the various operating arms 54 of the various cylinders are connected by a link 55 similar to the link 45, for producing simultaneous operation of all the rock-shafts 53. The rectangular block 51 does not fully occupy the space in the rectangular opening 50, but has sufficient lateral play therein to accommodate the slight circumferential movement of the timing ring 35 about its axis caused by the movement of the eccentrically located pin 42, and the opposite lateral movement of the block 51 caused by the eccentrically located pin 52.

Figure 9:
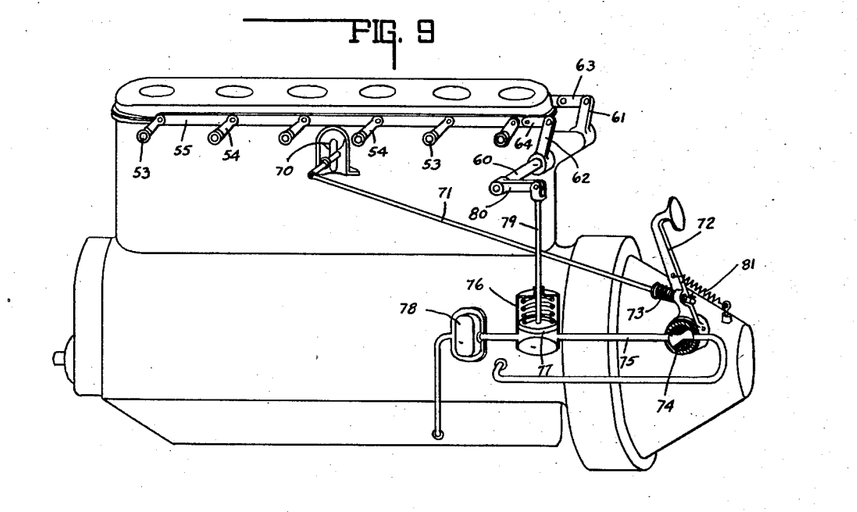
Fig. 9 is a perspective view of a multi-cylinder engine having the timing-ring timing-control, showing the application of common controlling mechanism thereto and to an associated carbureter.

The links 45 and 55 are arranged to be operated in common from a rock-shaft 60, (Fig.

9), having two upwardly extending arms 61 and 62 which are connected by short links 63 and 64 respectively to the links 45 and 55. Thus by rocking the shaft 60, all the rock-shafts 43 and 53 are simultaneously and similarly rocked.

Desirably the timing rings 35 of the engine are controlled by the same controlling mechanism that controls the carbureter. This is indicated diagrammatically in Fig. 9. Here the carbureter throttle valve 70, shown in its full-open position, is connected by a rod 71 to the accelerator pedal 72 by a resilient connection, such as a compression spring 73; which permits continued movement of the accelerator pedal 72 forward after the carbureter throttle 70 has reached the full-open limiting position in which it is shown. This accelerator pedal 72 is connected to a control valve 74, which is open during that part of the movement of the accelerator pedal 72 that produces movement of the carbureter valve 70; but continued forward movement of the accelerator pedal 72 after the carbureter throttle 70 has reached full-open position serves to move such valve 74 variably toward closed position. The valve 74 is located in a spillway pipe 75 leading from the bottom of a control cylinder 76 having a piston 77 therein, such piston being suitably spring-pressed downward. An oil pump 78, suitably driven in any convenient way, supplies oil to the bottom of the cylinder 76 below the piston 77, so that the oil pressure tends to push such piston upward against its spring; but the pressure exerted by the oil on the piston may be varied by the valve 74 as the latter cuts off the spillway passage 75 to a greater or less extent. This results in a control of the position of the piston 77 to produce an equilibrium between such variable oil pressure and the piston spring, the piston being in its lowermost position when the valve 74 is wide open and in its highest position when the valve 74 is fully closed. The piston 77 is connected by a link 79 to an operating arm 80 on the rock-shaft 60.

Thus as the accelerator pedal 72 is pushed forward from the position in which it is held by its spring 81, the first part of such movement is to control the throttle 70 of the carbureter. During this movement the timing rings 35 are all in their lowermost position. When the throttle 70 is fully opened, continued forward movement of the accelerator pedal 72 gradually closes the valve 74, thus restricting the spillway passage 75 and causing the piston 77 to rise gradually to rock the shaft 60 and all the shafts 43 and 53 to raise the various timing rings 35; which raising produces an advance of the opening of the exhaust and a retardation of the closing of the inlet, conducive to high-speed operation.

Instead of obtaining the timing control by a special timing ring 35, I may obtain it by raising or lowering one of the sleeve-valves 17 or 18, desirably the sleeve-valve 17, so that the whole movement of the ports of such sleeve is shifted along the axis of the cylinder. One suitable arrangement for doing this is shown in Fig. 5, and another in Figs. 6 and 7.

In the arrangement shown in Fig. 5, I have shown both sleeves 17 and 18 as having movements of pure reciprocation. This is obtained, in the form illustrated, from a valve-operating shaft 25, which has straight eccentrics $27^a$ and $28^a$ thereon for operating the sleeve-valves 17 and 18 respectively. As shown, the eccentric $28^a$ is connected to the outer sleeve-valve 18 by a sleeve-connecting rod $30^a$, which has a simple pivotal connection $32^a$ to the lower end of such outer sleeve-valve. The eccentric $27^a$ carries a sleeve-connecting rod $29^a$, but in this arrangement such sleeve connecting rod $29^a$ is not directly connected to the inner sleeve 17. Instead, the upper end of the sleeve-connecting rod $29^a$ is connected to a lever member 90, at an intermediate point thereon. The inner end of the lever member 90 is connected by a plain pivot pin $31^a$ to the lower end of the inner sleeve-valve 17. The lever member 90 furnishes a socket for a pin 91, which with the lever member 90 forms the complete lever; the two parts being provided with a sliding connection between them to allow for the variation in length of the lever in the timing adjustment, as will shortly appear. The outer end of the pin 91 has an eye 92 mounted on an eccentric 93 of a rock shaft 94 provided with an operating arm 95 by which it can be rocked. The rock-shaft 94 has an eccentric 93 for each cylinder, all such eccentrics being co-axial with one another. Each eccentric 93 forms the fulcrum for the associated lever 90—91, so that by rocking the arm 95 and shaft 94 the fulcrums 93 of all such levers are swung up or down about the axis of the rock shaft 94, the lever members 90 and pins 91 sliding relatively as required by such movement, and the inner sleeves 17 and their pivot joints $31^a$ to the sleeves being moved up and down oppositely to the movement of the fulcrums 93. With the eccentrics 93 in any given position, the rotation of the valve-operating shaft 25 moves the levers 90—91 up and down, and with a magnified movement correspondingly moves the inner sleeve-valve 17 up and down to control the valving of the associated cylinders. Such movement of the inner sleeve 17 from the valve operating shaft 25 is of the same general nature as that of the inner sleeve of any Knight-type of engine; but the operating mechanism involving the lever 90—91 is new with me so far as I know, and is claimed in my co-pending application Serial No. 80,268.

In the ordinary operation of the engine of Fig. 5, with the rock shaft 94 stationary, the sleeve-valves 17 and 18 are reciprocated in the general manner of Knight-type sleeve-valves, to control the porting of the engine cylinders. However, by rocking the rock-shaft 94, the timing of both the inlet and the exhaust may be varied, for engine operation at high-speed and low torque or at low speed and high torque as desired. The ordinary position is for low-speed high-torque conditions, for which conditions the operating arm 95 is in the position shown in full lines in Fig. 5, and the eccentrics 93 are all in or near their lowermost positions so that the whole movement of the inner sleeve 17 will be elevated. By turning the arm 95 to the dotted-line position shown in Fig. 5, the eccentrics 93 are raised, and correspondingly the whole movement of the inner sleeve 17 is lowered to shift the timing of the inlet and exhaust for high-speed conditions.

This is also clear from the diagram in Fig. 8. For low-speed conditions, the lines 200, 190, and 191 are as has already been explained. By raising the fulcrums of the levers 90—91, however, the paths indicated by these lines are all lowered to the paths indicated by the lines 200', 190', and 191'. The result of this is clear from the diagram. The lowering from the line 200 to the line 200' causes it to cross the line 350 at an earlier point in the cycle, thus advancing the opening of the exhaust, and increasing the time and area of the exhaust as indicated by oblique cross-hatching downward from right to left in the diagram in the left-hand half of Fig. 8.

Similarly, the shifting of the paths indicated by the lines 190 and 191 to the positions indicated by the lines 190' and 191' shifts both the opening and closing of the inlet, to points later in the cycle; the shifting of the closing of the inlet being the important and controlling factor in this shift, and the shifting of the opening of the inlet being merely incidental. The change in location of the inlet is indicated by the two areas cross-hatched downward from left to right in the right-hand half of Fig. 8 and below the line 350; the delay in the closing of the inlet being indicated by the area enclosed between the lines 350, 191', 160, and 191, and the incidental delay in the opening of the inlet being indicated by the area enclosed in the lines 350, 190', 210, and 190.

Figure 6:
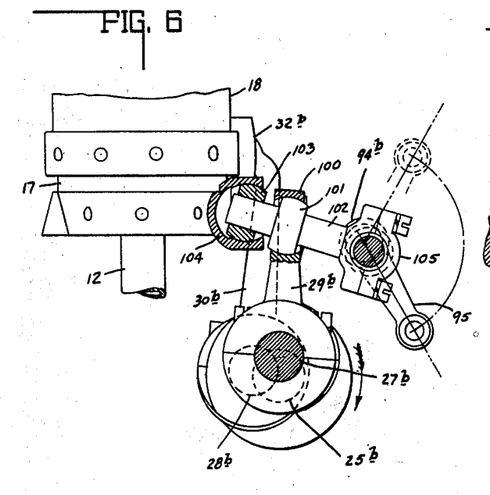
Fig. 6 is a fragmentary view similar to the lower part of Fig. 5, but with both sleeves movable with a combined axial reciprocation and circumferential oscillation.
Figure 7:
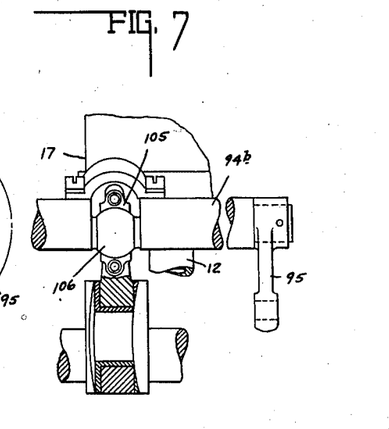
Fig. 7 is a fragmentary side elevation of the operating mechanism shown in Fig. 6.

In the arrangement shown in Figs. 6 and 7, I merely show a modified driving arrangement for the sleeve-valves 17 and 18. Here the valve-operating shaft 25$^b$ has two wobble-cranks 27$^b$ and 28$^b$ for each cylinder. The wobble-crank 28$^b$ is connected by a sleeve-connecting rod 30$^b$ and a ball-and-socket joint 32$^b$ to an outer sleeve 18 in a manner already explained in connection with Figs. 1 and 2, to give the outer sleeve a combined movement of circumferential oscillation and axial reciprocation, so that any point thereon moves in a closed curved path. The wobble-crank 27$^b$ carries a sleeve-connecting rod 29$^b$, which is provided at its upper end with a socket 100 receiving a ball member 101 at an intermediate point on a lever 102. The inner end of the lever 102 has a sliding fit within a ball member 103, which fits within a socket 104 on the lower end of the inner sleeve 17; and the outer end of the lever 102 is provided with a socket member 105 which fits on a ball-shaped eccentric 106 on a rock shaft 94$^b$ operable by an operating arm 95 in the same way that the rock-shaft 94 of Fig. 5 is operated. The ball-shaped eccentric 106 constitutes the fulcrum for the lever 102; and the variation in length of the lever 102 is taken care of by the sliding of its inner end in the ball member 103. The various ball members are suitably removable from their associated socket members, by any suitable construction; but I have not attempted here to show any such construction, as various constructions can be used.

With the rock-shaft 94$^b$ in any stationary position, the rotation of the valve-operating shaft 25$^b$ not only serves to give the outer sleeve 18 a movement of combined axial reciprocation and circumferential oscillation, but serves to give the inner sleeve 17 a similar combined movement. The two sleeve-valves 17 and 18 move in their respective paths to control the valving of the associated cylinder.

However, by rocking the shaft 94$^b$, the fulcrum for the lever 102 may be raised or lowered, and the path of movement of the inner sleeve 17 may be correspondingly lowered or raised. This produces a control of the timing in the same general manner as has been explained in connection with the structure illustrated in Fig. 5.

All the arrangements so far described in this application have been directed to two-sleeve engines. Similar control of the timing for a single-sleeve-valve engine is also obtainable by modifications of the illustrated arrangements. This is shown in my aforesaid co-pending application Serial No. 80,268, both with an adjustable timing ring in the top of the cylinder and with an adjustment of the movement of the sleeve-valve itself. Such prior application Serial No. 80,268, however, has some of its more specific claims directed to the timing by the shifting of the fulcrum of a lever forming part of the normal operating connection of a sleeve-valve from a valve-operating shaft, and contains no claims specifically directed to the control of the timing by a special timing ring. As this timing ring is specifically claimed here, and is applicable both to two-sleeve-valve engines and to single-sleeve-valve engines, I show in Fig. 4 a timing-ring construction for a single-sleeve-valve engine.

Figure 4:
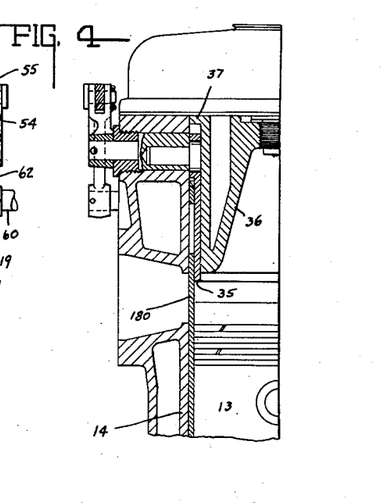
Fig. 4 is a fragmental view similar to the upper left-hand part of Fig. 1, showing the application of the separate timing ring to a single-sleeve engine.

In such arrangement shown in Fig. 4, the piston 13, the cylinder 14, the cylinder head 37 with its plug-portion 36, the timing ring 35 and its operating mechanism (although the junk-ring 38 is omitted), and the usual engine parts are in general substantially the same as illustrated in Fig. 1. However, instead of the two sleeve-valves 17 and 18 of Fig. 1, I provide a single sleeve-valve 180, which may correspond in its general motion with the outer sleeve-valve 18 of Fig. 1, and may be similarly driven. This single sleeve-valve 18 may have the usual motion of the sleeve-valve of a single-sleeve engine, which involves both circumferential oscillation and axial reciprocation in the same way that the sleeve-valve 18 of Fig. 1 has it. By moving the timing ring 35 up or down, the timing of the opening of the exhaust and of the closing of the inlet may be varied in the same general manner as has already been explained in connection with the arrangement shown in Fig. 1.

It is to be noted that in both constructions which I employ to effect variations in valve timing both sleeve-valves have a cyclic axial movement—i. e., the high and low points of sleeve-valve travel occur at substantially the same point in the engine cycle irrespective of the operation of the mechanism employed to alter the valve timing. It is further to be noted that the variable valve timing is obtained in the double sleeve-valve engine described by the use of a single valve-operating shaft.

I claim as my invention:—

1. In an internal combustion engine, the combination of a cylinder, a piston, one or more sleeve-valves for controlling the porting of the cylinder, and a timing ring concentric with the sleeve-valve or sleeve-valves, and adjustable axially to control the timing of the cylinder porting.

2. In an internal combustion engine, the combination of a cylinder, a piston, one or more sleeve-valves for controlling the porting of the cylinder, and a timing ring concentric with the sleeve-valve or sleeve-valves, and adjustable to control the timing of the cylinder porting.

3. In an internal combustion engine, the combination of a cylinder, a piston, one or more sleeve-valves surrounding said piston and located between the cylinder and the piston, a timing ring located in the head end of the cylinder and co-operating with the sleeve-valve or sleeve-valves to control the cylinder porting, said timing ring being adjustable axially to control the timing of the cylinder porting.

4. In an internal combustion engine, the combination of a cylinder, a piston, one or more sleeve-valves surrounding said piston, a timing ring located in the head end of the cylinder and co-operating with the sleeve-valve or sleeve-valves to control the cylinder porting, said timing ring being adjustable axially to control the timing of the cylinder porting.

5. In an internal combustion engine, the combination of a cylinder, a piston, one or more sleeve-valves surrounding said piston and located between the cylinder and the piston, a timing ring located in the head end of the cylinder and co-operating with the sleeve-valve or sleeve-valves to control the cylinder porting, said timing ring being adjustable to control the timing of the cylinder porting.

6. In an internal combustion engine, the combination of a cylinder, a piston, one or more sleeve-valves surrounding said piston, a timing ring located in the head end of the cylinder and co-operating with the sleeve-valve or sleeve-valves to control the cylinder porting, said timing ring being adjustable to control the timing of the cylinder porting.

7. In an internal combustion engine, the combination of a cylinder, a piston, a plurality of sleeve-valves surrounding the piston and located between the piston and the cylinder, said sleeve-valves having cyclic axial movements, and means for varying the point in the engine cycle where the exhaust ports start their opening while maintaining a substantially fixed phase relationship between movements of the sleeve-valves and movements of the piston.

8. In an internal combustion engine, the combination of a cylinder, a piston, a plurality of sleeve-valves having cyclic axial movements, and means for varying the point in the engine cycle where the exhaust ports start their opening while maintaining a substantially fixed phase relationship between movements of the sleeve-valves and movements of the piston.

9. In an internal combustion engine, the combination of a cylinder, a piston, a plurality of sleeve-valves surrounding the piston and having cyclic axial movements, and means for varying the point in the engine cycle where the exhaust ports start their opening while maintaining a substantially fixed phase relationship between movements of the sleeve-valves and movements of the piston.

10. In an internal combustion engine, the combination of a cylinder, a piston, a plurality of sleeve-valves surrounding the piston and located between the piston and the cylinder, said sleeve-valves having cyclic axial movements, and means for varying the point in the engine cycle where the exhaust ports start their opening and the point in the engine cycle where the inlet ports complete their closing while maintaining a substantially fixed phase relationship between movements of the sleeve-valves and movements of the piston.

11. In an internal combustion engine, the combination of a cylinder, a piston, a plurality of sleeve-valves having cyclic axial movements, and means for varying the point in the engine cycle where the exhaust ports start their opening and the point in the engine cycle where the inlet ports complete their closing while maintaining a substantially fixed phase relationship between movements of the sleeve-valves and movements of the piston.

12. In an internal combustion engine, the combination of a cylinder, a piston, a plurality of sleeve-valves surrounding the piston and having cyclic axial movements, and means for varying the point in the engine cycle where the exhaust ports start their opening and the point in the engine cycle where the inlet ports complete their closing while maintaining a substantially fixed phase relationship between movements of the sleeve-valves and movements of the piston.

13. In an internal combustion engine, the combination of a cylinder, a piston, a plurality of sleeve-valves surrounding the piston and located between the piston and the cylinder, said sleeve-valves having cyclic axial movements, and means for varying the point in the engine cycle where the inlet ports complete their closing while maintaining a substantially fixed phase relationship between movements of the sleeve-valves and movements of the piston.

14. In an internal combustion engine, the combination of a cylinder, a piston, a plurality of sleeve valves having cyclic axial movements, and means for varying the point in the engine cycle where the inlet ports complete their closing while maintaining a substantially fixed phase relationship between movements of the sleeve-valves and movements of the piston.

15. In an internal combustion engine, the combination of a cylinder, a piston, a plurality of sleeve-valves surrounding the piston and having cyclic axial movements, and means for varying the point in the engine cycle where the inlet ports complete their closing while maintaining a substantially fixed phase relationship between movements of the sleeve-valves and movements of the piston.

16. In an internal combustion engine, the combination of a cylinder having inlet and exhaust ports, a piston, a plurality of sleeve-valves surrounding the piston and located between the piston and the cylinder, said sleeve-valves having cyclic axial movements, and means for varying the valve-timing of such engine while maintaining a substantially fixed phase relationship between movements of the sleeve-valves and movements of the piston.

17. In an internal combustion engine, the combination of a cylinder having inlet and exhaust ports, a piston, a plurality of sleeve-valves having cyclic axial movements, and means for varying the valve-timing of such engine while maintaining a substantially fixed phase relationship between movements of the sleeve-valves and movements of the piston.

18. In an internal combustion engine, the combination of a cylinder having inlet and exhaust ports, a piston, a plurality of sleeve-valves surrounding the piston and having cyclic axial movements, and means for varying the valve-timing of such engine while maintaining a substantially fixed phase relationship between movements of the sleeve-valves and movements of the piston.

19. In combination, an internal combustion engine of the sleeve-valve type, said engine being provided with means for varying its valve-timing for low-speed and for high-speed operation, said valve-timing device being normally set for low-speed operation, a carbureter, and a common control device for operating said carbureter to increase the engine speed and for subsequently operating the timing-control device of the engine to obtain a further increase in speed.

20. In combination, an internal combustion engine said engine being provided with means for varying its valve-timing for low-speed and for high-speed operation, said valve-timing device being normally set for low-speed operation, a carbureter, and a common control device for operating said carbureter to increase the engine speed and for subsequently operating the timing-control device of the engine to obtain a further increase in speed.

21. In an internal combustion engine, the combination of a cylinder, a piston, a plurality of sleeve-valves surrounding the piston and located between the piston and the cylinder, a single valve-operating shaft for operating said sleeve-valves, and means for varying the point in the engine cycle where the exhaust ports start their opening.

22. In an internal combustion engine, the combination of a cylinder, a piston, a plurality of sleeve-valves, a single valve-operating shaft for operating said sleeve-valves, and means for varying the point in the engine cycle where the exhaust ports start their opening.

23. In an internal combustion engine, the combination of a cylinder, a piston, a plurality of sleeve-valves surrounding the piston, a single valve-operating shaft for operating said sleeve-valves, and means for varying the point in the engine cycle where the exhaust ports start their opening.

24. In an internal combustion engine, the combination of a cylinder, a piston, a plurality of sleeve-valves surrounding the piston and located between the piston and the cylinder, a single valve-operating shaft for operating said sleeve-valves, and means for varying the point in the engine cycle where the exhaust ports start their opening and the point in the engine cycle where the inlet ports complete their closing.

25. In an internal combustion engine, the combination of a cylinder, a piston, a plurality of sleeve-valves, a single valve-operating shaft for operating said sleeve-valves, and means for varying the point in the engine cycle where the exhaust ports start their opening and the point in the engine cycle where the inlet ports complete their closing.

26. In an internal combustion engine, the combination of a cylinder, a piston, a plurality of sleeve-valves surrounding the piston, a single valve-operating shaft for operating said sleeve-valves, and means for varying the point in the engine cycle where the exhaust ports start their opening and the point in the engine cycle where the inlet ports complete their closing.

27. In an internal combustion engine, the combination of a cylinder, a piston, a plurality of sleeve-valves surrounding the piston and located between the piston and the cylinder, a single valve-operating shaft for operating said sleeve-valves, and means for varying the point in the engine cycle where the inlet ports complete their closing.

28. In an internal combustion engine, the combination of a cylinder, a piston, a plurality of sleeve-valves, a single valve-operating shaft for operating said sleeve-valves, and means for varying the point in the engine cycle where the inlet ports complete their closing.

29. In an internal combustion engine, the combination of a cylinder, a piston, a plurality of sleeve-valves surrounding the piston, a single valve-operating shaft for operating said sleeve-valves, and means for varying the point in the engine cycle where the inlet ports complete their closing.

30. In an internal combustion engine, the combination of a cylinder having inlet and exhaust ports, a piston, a plurality of sleeve-valves surrounding the piston and located between the piston and the cylinder, a single valve-operating shaft for operating said sleeve-valves, and means for varying the valve-timing of such engine.

31. In an internal combustion engine, the combination of a cylinder having inlet and exhaust ports, a piston, a plurality of sleeve-valves, a single valve-operating shaft for operating said sleeve-valves, and means for varying the valve-timing of such engine.

32. In an internal combustion engine, the combination of a cylinder having inlet and exhaust ports, a piston, a plurality of sleeve-valves surrounding the piston, a single valve-operating shaft for operating said sleeve-valves, and means for varying the valve-timing of such engine.

In witness whereof I have hereunto set my hand at Indianapolis, Indiana, this 16th day of August, A. D. one thousand nine hundred and twenty-six.

JULES HALTENBERGER.